United States Patent [19]

Brambilla et al.

[11] 4,297,174
[45] Oct. 27, 1981

[54] PYROELECTROCHEMICAL PROCESS FOR REPROCESSING IRRADIATED NUCLEAR FUELS

[75] Inventors: Giovanni Brambilla, Stagno; Adelmo Sartorelli, Forli', both of Italy

[73] Assignee: Agip Nucleare, S.p.A., Rome, Italy

[21] Appl. No.: 18,730

[22] Filed: Mar. 8, 1979

[51] Int. Cl.³ ............................................... C25C 1/22
[52] U.S. Cl. ........................................ 204/1.5; 423/5
[58] Field of Search ............................. 204/1.5; 423/5

[56] References Cited

U.S. PATENT DOCUMENTS 3,932,225 1/1976 Bilal et al. ............................. 204/1.5
3,981,960 9/1976 Brambilla et al. ....................... 423/5
4,021,313 5/1977 Hausberger et al. ................. 204/1.5
4,092,397 5/1978 Brambilla et al. ....................... 423/5

*Primary Examiner*—Leland A. Sebastian
*Attorney, Agent, or Firm*—Morgan, Finnegan, Pine, Foley & Lee

[57] ABSTRACT

In a method for reprocessing irradiated nuclear fuels, the fuel to be reprocessed is dissolved in a fused-salt bath while absolute sulfuric acid is added dropwise to said bath, plutonium sulfate is thermally converted into the corresponding oxide, the uranium oxide is electrolytically deposited from the fused-salt bath as the electrolyte, the melted salts are recycled to the starting end of the process and the fission products and the melted salts are conditioned for final disposal.

7 Claims, 1 Drawing Figure

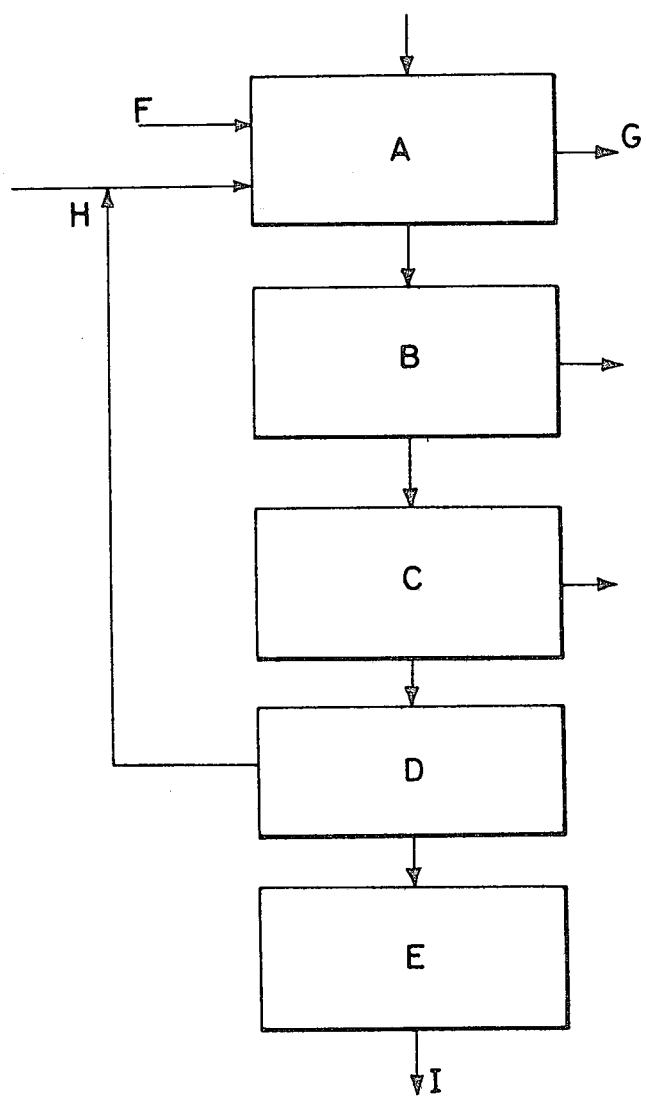

PYROELECTROCHEMICAL PROCESS FOR REPROCESSING IRRADIATED NUCLEAR FUELS

This invention relates to a pyroelectrochemical process for reprocessing irradiated nuclear fuels, preferably those coming from fast nuclear reactors.

The pyroelectrochemical process according to the present invention can be applied to the mixed synthesized oxides $UO_2$-$PuO_2$, to the mixed carbides UC-PuC and also to the individual oxides and carbides of uranium, plutonium and thorium and their mixtures.

Reprocessing irradiated fuels in the fast nuclear reactors poses a number of new problems which are summarized concisely herein.

In the wet reprocessing, the high residual power of the fuel should not impair, by radiolysis, the stability of the organic phase.

Comparatively long cooling times (6 to 9 months) are thus required.

In the dry processes, in which the reactants which are used are insensitive to the radiations, the cooling time can considerably be reduced (1 month).

To shorten the times of stay of the fast fuel, which has a high residual value, out of the nuclear reactor affords also considerable savings on the liabilities connected with the locking up of the plutonium capital.

The high burn-up ratings and the numerous recycling operations to be undergone by the fuels discharged in the future from the fast reactors shall modify in a substantial manner the reprocessing patterns.

As a matter of fact, until such time as plutonium is recovered from fuels having a short exposure time, the alpha activity alone of $Pu_{239}$ makes it imperative to adopt, in the subsequent reprocessing, alpha-proof glove boxes without any necessity of gamma- and neutronic shields.

With higher irradiation levels, conversely, considerable amounts of plutonium isotopes are formed due to subsequent reactions (n, gamma) as well as not negligible amounts of neptunium and transplutonic elements.

Under those circumstances it will become necessary to resort to remote- or semi-remote handling equipments and it shall be meaningless to require of the reprocessing procedures a complete separation of plutonium and uranium from the fission products, such as is required by the present specification.

Thus, the dry procedures will not be impaired by the shortcoming that high decontamination factors cannot be achieved with them, that which is now the principal criticism against their evolution.

The high burn-up fast fuels display a high concentration of fission products (10%).

Among them, tritium is particularly important since its production is, with the same burn-up, from 2 to 3 times greater in a fast reactor than is in a thermal reactor.

The presence of considerable amounts of tritium might involve, in order to prevent its irreversible dilution, the total recycling of water in a wet process.

In the dry processes, conversely, the gaseous fission products (iodine, xenon, krypton, tritium) are totally set free in a concentrated form without dilution in other gases and liquids, since the first stage of attack of the fuel.

The fuel of a fast reactor maintains, for the same cooling time, a specific residual power which is about 10 times higher than that of a fuel of a thermal reactor.

In the wet process is thus vital, if cooling times in the order of a few months must be observed, to reprocess the fuel and the fertile material of the cladding, in order to dilute the residual heat of the former.

In this case, the specific powers are about 3 times greater than those of a thermal-reactor fuel.

In the case of the dry processes, in which the reactants which are used are thermally stable, this necessity no longer exists, but it is possible to process the core material and the cladding material separately, thus avoiding, in the head-end procedure, the additional step of regrouping the disassembled bars prior to cutting.

The pyroelectrochemical process according to the present invention is an extension and an improvement of the previous pyrochemical process based on the physical degradation and dissolution of the fuel coming from fast reactors (mixed oxides or carbides of uranium and plutonium) in melted nitrates (Italian Pat. Nos. 959 654; 951 873 owned by AGIP NUCLEARE S.p.A.) and on the separation of plutonium by thermal decomposition.

According to the latter method, fused salts or solutions containing active fission products are supplemented by silica and titanium dioxide the water which is possibly present being then evaporated off, then the mixture is fired at 800° C.-850° C., melted at 900°-1200° C. and the molten mass is abruptly cooled and a glassy solid is obtained which is both infrangible and insoluble.

As the other dry procedures do, the pyroelectrochemical method makes it possible to process the irradiated fuels after a short decay, since there is no problem as to thermal and radiolytic degradation of the solvents and as to the complete extraction of the fission gases in a concentrated form. In addition, the pyroelectrochemical process permits that comparatively high decontamination factors may be attained, even though these cannot be compared with those which can be obtained with the aqueous procedures.

Due to the lesser complication of the stage required in comparison with the aqueous processes, the present method can be exploited, moreover, in a small compact facility integrated with the reactor or a group of reactors, the shipping of highly active fuels being thus dispensed with.

The instant pyroelectrochemical process uses as the reaction medium a bath of molten salts composed by eutectic mixtures of alkali metal sulfates.

| EUTECTIC MIXTURES OF SULFATES | MELTING POINT |
| --- | --- |
| $Li_2SO_4$—$K_2SO_4$—$Na_2SO_4$(78-8.5-13.5 molar %) | 512° C. |
| $Li_2SO_4$—$K_2SO_4$ (80-20 molar %) | 535° C. |

The method comprises the following steps, as reported, by way of nonlimiting example, in the block diagram shown in the accompanying drawings:

A. Dissolution of Fuel.

The fuel is dissolved in the molten sulfates by the action of absolute sulfuric acid (100%) dropping in the bath kept at a temperature of 550° C.-600° C.

The sintered oxides $UO_2$-$PuO_2$ when immersed in the molten sulfates are not disaggregated but, rather, they pass directly in solution as a result of the attack by the bisulfates which are formed by reaction between the sulfates and the added sulfuric acid.

For example, for potassium:

1. $2K_2SO_4 + 2H_2SO_4 \longrightarrow 4KHSO_4$

2. $UO_2 + 4KHSO_4 \longrightarrow UO_2SO_4 + 2K_2SO_4 + SO_2 + 2H_2O$

3. $PuO_2 + 4KHSO_4 \longrightarrow Pu(SO_4)_2 + 2K_2SO_4 + 2H_2O$

The sintered carbides UC-PuC, conversely, are quickly disaggregated as they are immersed in the fused-salt bath.

Alkali metal bisulfates can directly be employed, even though this is not advisable for reasons of weight balance.

Inasmuch as the dissolution is not selective with respect to the claddings, the removal of the cladding from the fuel elements can be carried out, in the case of the oxides, by attack with liquid metals, the mechanical cutting being thus dispensed with.

The dissolution of the cladding takes place by immersing the fuel element in zinc or metallic alloys, such as Cu-Sb, at a temperature of 800° C.–950° C.

The dissolution ratings for stainless steel are variable from 10% to 40% by weight.

The fuel which is left undissolved on the bottom of the crucible is separated by filtering it off from the liquid metal dissolver.

In the case of the carbides, conversely, the claddings can easily be separated from the fuel: as a matter of fact, by immersing in a fused-salt bath a metallic basket containing the cut element slugs, the stainless steel claddings are not attacked whereas the fuel proper, in powder form, exits the claddings and is deposited on the vessel bottom. Once the fuel is completely separated from the cladding, the basket with the empty shells is withdrawn from the molten bath.

At any rate the oxides can be disaggregated in the molten sulfates by the action of appropriate oxidizing agents such as oxygen, air, molten nitrates.

The presence of residual elemental sodium on the claddings does not originate any troubles since sodium becomes dissolved in the molten sulfates without bursting into flame and $Na_2O$ with $Na_2SO_3$ are formed, which are subsequently converted into sulfates by the action of sulfuric acid:

$2Na + Na_2SO_4 \rightarrow Na_2O + Na_2SO_3$

High concentrations of oxides can be obtained in the molten salts, up to 50% by wt.

B. THERMAL DECOMPOSITION OF PLUTONIUM.

By raising the temperature of the molten bath to 750° C.–800° C. the plutonium sulfate $Pu(SO_4)_2$, which is thermally unstable, is decomposed with the attendant formation of uranium-free, black, crystalline $PuO_2$ which collects on the bottom of the vessel, whereas uranyl sulfate $UO_2SO_4$ remains unaffected.

The recovery of plutonium is complete up to 98% after a stay of the molten bath at a temperature between 800° C. and 760° C. for a time comprised between 90 and 120 hours.

C. ELECTRODEPOSITION OF URANIUM.

By introducing in the molten sulfates, at the temperature of 550° C.–600° C., a couple of electrodes between which a difference of potential of 0.5 to 1.0 Volts is maintained, an electrolytic cell is formed on the cathode of which $UO_2$ is deposited, whereas sulfur trioxide and oxygen are evolved at the anode, according to the reactions:

CATHODE
$UO_2SO_4 \longrightarrow UO_2^{++} + SO_4^{--}$
$UO_2^{++} + 2e^- \longrightarrow UO_2$ ANODE
$SO_4^{--} \longrightarrow SO_4 + 2e^-$
$SO_4 \longrightarrow SO_3 + \frac{1}{2}O_2$ The formation of metallic uranium with this type of electrolysis cannot take place inasmuch as it would necessitate an oxygen-free source of uranium ions and a higher potential.

The electrodeposited $UO_2$ is crystalline, compact and sticking to the electrode, the O/U ratio being exactly stoichiometric.

In a set of tests on irradiated $UO_2$ supplemented by additional $UO_2$ which contained a synthetic mixture of stable isotopes so as to simulate a 5% burn-up the behavior has been scrutinized of a few fission products (cerium, caesium, zirconium, niobium, ruthenium) which were analyzed by gamma-spectrometry, and also that of other elements (strontium, molybdenum, samarium) which were analyzed by atomic absorption.

There have been obtained for the electrodeposited $UO_2$ the following decontamination factors (ratio of initial to final contamination of an element in $UO_2$):

| ELEMENT OF NUCLIDE | DECONTAMINATION FACTOR |
| --- | --- |
| $^{144}Ce$ | ∞(*) |
| $^{137}Cs$ | ∞ |
| $^{95}Zr$–$^{95}Nb$ | 0 |
| $^{103}Ru$ | 50 |
| Sr | 1,000 |
| Mo | 500 |
| Sm | 100 |

(*) The symbol ∞ means that no activity of the electrodeposited $UO_2$ has been detected.

The overall decontamination factor as determined on the irradiated $UO_2$ has been in the order of 30 to 50.

The uranium as a residue of the electrolysis of the melted salts is less than 15 parts per million (ppm) of U.

ELECTRODEPOSITION OF URANIUM-PLUTONIUM

By dispensing with the plutonium thermal decomposition stage and operating in a manner similar to that described in the preceding paragraph, it is possible electrolytically to deposit on the cathode a solid solution of $UO_2$-$PuO_2$.

The plutonium as a residue of the electrolysis of the melted salts is, in this case, less than 30 ppm of Pu.

D. RECYCLING THE MELTED SALTS.

The melted salts, after a possible decontamination which can be effected by precipitating the fission products from the solution with basic agents such as oxides, carbonates, hydroxides, can be recycled at the starting end of the process.

The only element which cannot be removed from the melted salts is caesium, which would accumulate in the melted salts and would render the periodical disposal and the partial renewal with fresh salts unavoidable.

E. CONDITIONING THE MELTED SALTS AND THE FISSION PRODUCTS.

The melted salts which contain the fission products are conditioned by embedding them in a metallic matrix, according to a procedure which is already known for fired materials and glasses, and which comprises the following steps:

reduction of the melted sulfates to a solid granular form by dropping onto a cold surface, dispersion of the particles thus obtained, having a diameter of 3 to 5 mm in a metallic matrix by casting a liquid alloy onto the granular material arranged in a cylindrical vessel.

The granules are distributed evenly in the metallic matrix which fills the void spaces and occupies about the 30% of the overall volume.

The heat conductivity of the final product (10 to 30 $W.m^{-1}.°C.^{-1}$) exceeds by a factor of 15 to 30 that of glasses, thus making it possible to maintain at the center of a cylindrical block having a diameter of 50 cm and a height of 1.5 m and a power density of 100 W $liter^{-1}$, a maximum temperature of 450° C.-500° C., lower than the melting point of the alkali metal sulfates.

Two kinds of alloys can be used with advantage, viz.:
lead alloys, melting in the range 250° C.-320° C.
Zinc alloys, melting in the range 400° C.-500° C.

As an alternative, the melted sulfates can be vitrified to silico-titanates, by decomposition at temperatures higher than 800° C. with coal and silica and subsequent melting at 1000° C.-1200° C. with titanium dioxide according to reactions which are, for example for Na, the following:

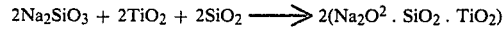

$$2Na_2SO_4 + 2C + 2SiO_2 \longrightarrow 2Na_2SiO_3 + 2CO_2 + SO_2 + S$$

$$2Na_2SiO_3 + 2TiO_2 + 2SiO_2 \longrightarrow 2(Na_2O^2 . SiO_2 . TiO_2)$$

The silico-titanate glasses, while containing a high amount of alkali metals (sodium, potassium and lithium) have dissolution ratings by water which can be compared to those of the phosphate and borosilicate glasses.

The electrolytically deposited oxides, prior to becoming available for the reprocessing of the fuel, must be subjected to the operations of:
mechanical removal of the electrode
milling
washing with water, to remove the melted salt
classification
admixture with other oxide to restore the original composition.

The instant process is capable of ensuring an overall decontamination factor which is never below 10 and which can be improved by carrying out a pluralstep electrolysis in which the $UO_2$-coated cathode of a cell acts as the soluble anode in the next cell by virtue of a polarity inversion.

While the decontamination factors which can anyhow be attained cannot be compared with those of the aqueous processes, as outlined above, the isotopic composition of the fast fuel as such will require at any rate the adoption of remote-handling procedures of manufacture which will make the complete separation of the fission products from plutonium or from uranium unnecessary.

The volume of the final wastes, which are composed by solidified sulfates and fission products embedded in metallic matrices or by silico-titamate glasses incorporating the fission products assuming that there are performed:

5 recyclings of the melted sulfates in the treatment of the fuel material in the reactor core ($UO_2$-20%$PuO_2$), and 100 recyclings of the melted sulfates in the treatment of the fertile material of the reactor cladding ($UO_2$2-%$PuO_2$), is about 1.6 to 1.8 times higher than the volume of the vitrified wastes of the aqueous procedures.

According to updated estimates an aqueous-reprocessing plant should have, to be actually competitive, a potential output of reprocessed fuel of some 1500 tonnes a year, which is equivalent to the amount dumped yearly by about 50 nuclear power stations of 1,000 $MW_e$ each.

The dry methods, conversely, permit that unit costs of the reprocessed fuel substantially in the same order of magnitude be obtained, by virtue of the lesser number of processing stages and a greater compactness of the apparatus, on account of the scale economy inasmuch as small closed loop plants integrated with the reactor or a pool of reactors can be adopted.

Summing up, the potential advantages in general of an integrated plant based on the technology of dry reprocessing, are bound to the lesser initial investment cost, the suppression of the shipping of the irradiate fuel and the attendant improvement of public safety, the reduction of the cooling times and thus of the expenses due to the plutonium lockup.

The advantages of more particular nature of the pyroelectrochemical process are:

The obtention of fairly high decontamination factors of plutonium and uranium so as to reduce the parasitic capture of neutrons to acceptable levels;

The quantitative recovery of plutonium and uranium in the form of oxides, $PuO_2$ and $UO_2$, either distinctly or admixed, reactor-grade, which are directly available for reprocessing the fuel;

The suppression of the loss of plutonium which occurs in the aqueous procedures due to its incomplete dissolution and which may reach 3%.

The drastic attack with melted sulfates and sulfuric acid ensures a total dissolution, the result being an oecological advantage.

In the block diagram of the pyroelectrochemical method according to the present invention, as depicted in the single FIGURE of the accompanying drawings, the $UO_2$-$PuO_2$ fuel is dissolved, at A, preferably at 550° C.-600° C. in the melted sulfates by the action of $H_2SO_4$ (absolute) coming from F, whereas the fission products in the gaseous state and the Ru are discharged at G.

The second stage (B) is the thermal decomposition of plutonium sulfate $Pu(SO_4)_2$ to $PuO_2$, which is carried out by raising the temperature (preferably up to 750° C.-800° C.) of the plutonium sulfate, whereas the electrodeposition of uranium takes place at C.

The melted salts (D) are recycled to the starting end of the process at H. The melted salts which contain the fission products are conditioned at E by encasing them in a metallic matrix, whereafter the fission products are forwarded to final storage at I.

For illustrating the present invention without limiting it, the following examples are reported hereafter.

EXAMPLE 1

(Dissolution of $UO_2$)

A sintered $UO_2$-pellet weighing 20.0 grams was immersed in 100 grams of a ternary eutectic mixture $Li_2SO_4$—$K_2SO_4$—$Na_2SO_4$ (mol % 78.0-8.5-13.5, respectively) which was maintained in the liquid state at the temperature of 575° C.

There were added cautiously by direct dropwise introduction, 18.0 grams of 100% $H_2SO_4$ as obtained by admixing 98% sulfuric acid with fuming sulfuric acid (oleum) containing 20% of $SO_3$.

After 5-hour reaction, the pellet had completely passed in solution in the melted salt.

EXAMPLE 2

(Dissolution and separation of Pu/U by thermal decomposition to $PuO_2$)

A sintered $UO_2$-18% $PuO_2$-pellet weighing 1.6 gram was dissolved, operating with 5.0 grams of 100%-$H_2SO_4$ as in Example 1, in a molten bath composed by 100 grams of a ternary eutectic mixture $Li_2SO_4$—$K_2SO_4$—$Na_2SO_4$ at the temperature of 575° C. The temperature of the fused salt bath, containing 24.8 milligrams of Pu per gram of salt, was subsequently raised to 800° C. and thus maintained for 50 hours, then lowered to 760° C. for 140 hours.

Under these conditions, the plutonium sulfate $Pu(SO_4)_2$, which is unstable, was decomposed to the oxide $PuO_2$ which was slowly and gradually deposited on the reactor bottom.

On completion of the decomposition, there were left in solution 0.05 milligrams of Pu per gram of salt and all uranium which was initially present, that which corresponds to the precipitation of the 98% of the uranium-free initial plutonium.

EXAMPLE 3

(Electrodeposition of $UO_2$)

A sintered $UO_2$-pellet weighing 1.8 gram, irradiated for one hour with a flux of $63.10^{12}$n/cm$^2$/sec and decayed for about 2 months, and 0.2 gram of "fissium" (non-irradiated $UO_2$ containing, however, a synthetic mixture of stable isotopes to simulate a 5% burnup) were dissolved in 100 grams of an eutectic mixture (ternary) of $Li_2SO_4$—$K_2SO_4$—$Na_2SO_4$, in the melted state and operating with 100% $H_2SO_4$ as in Example 1, at the temperature of 575° C.

The fused salts were subjected to gamma-counting to determine the initial activity of the individual fission products which were present. In the fused salt bath there were immersed two electrodes of platinum wire of a diameter of 1.0 mm. connected with a DC source. Between the two electrodes a difference of potential of 1.3 V was applied, corresponding to the flow of a current having the intensity of 10 milliamperes.

After about 25 hours, the electrolysis was completed as shown by the absence of uranium in the melted salts. The latter were subjected to gamma-counting again and so also the $UO_2$ deposited on the cathods, the results being as follows:

| Element | Initial activity in salt disint/minute | Final activ. in salt disint./minute | % Element in salt | % Activity in the electro- dep. $UO_2$ disint./minute | % Element in $UO_2$ |
|---|---|---|---|---|---|
| 144$_{Cerium}$ | 4418.0 | 4519.0 | 100 | 0 | 0 |
| 137$_{Cerium}$ | 475.4 | 490.0 | 100 | 0 | 0 |
| 101$_{Ruthenium}$ | 199.6 | 12.0 | 44 | 1.9 | 25 |
| 95$_{Zirc . Niobium}$ | 103.6 | 0 | 0 | 104.3 | 100 |
| 235$_{Uranium}$ | 273.0 | 0 | 0 | 271.0 | 100 |

EXAMPLE 4

(Electrodeposition of $UO_2$-$PuO_2$)

A sintered $UO_2$-18% $PuO_2$ pellet weighing 0.6 gram was dissolved with 100%-$H_2SO_4$ operating as in Example 1, in 100 grams of a ternary eutectic mixture of $Li_2SO_4$—$K_2SO_4$—$Na_2SO_4$ at the temperature of 575° C.

The fused salt contained 91 milligrams of Pu per gram of salt and 430 mg of U per gram of salt. After having immersed in the molten bath two platinum electrodes as in Example 3, electrolysis was carried out at 1.5 V and 30 mA at the temperature of 600° C. After 45 hours there was left in solution 0.03 milligram of Pu per gram of salt and 0.015 milligram of U per gram of salt, that which indicated that 99.7% of uranium and 99.9% of plutonium which were initially present in the melted salts had been co-deposited on the cathode in the form of mixed oxides.

We claim:

1. A pyroelectrochemical method for the reprocessing of irradiated nuclear fuels coming preferably from fast reactors, characterized in that it comprises the steps of:
   (a) dissolving the nuclear fuel, containing fission products, in a bath comprising molten alkali metal sulfates,
   (b) thermally decomposing the plutonium sulfate, $Pu(SO_4)_2$, formed in said molten bath to plutonium oxide, $PuO_2$,
   (c) electrodepositing uranium oxide on the cathode of an electrolytic cell provided in said molten bath,
   (d) recycling the melted sulfates of said molten bath to the start of the process, and
   (e) conditioning said fission products and said melted sulfates.

2. A pyroelectrochemical process for the reprocessing of irradiated nuclear fuels according to claim 1, characterized in that the dissolution of the nuclear fuel based on oxides $UO_2$-$PuO_2$ or on carbides UC-PuC takes place in the molten sulfates by the action of absolute sulfuric acid (100% $H_2SO_4$) added dropwise to the molten salt bath, or by the action of alkali metal bisulfates, at the temperature of 550° C.-600° C.

3. A pyroelectrochemical process for the reprocessing of irradiated nuclear fuels according to claim 1, characterized in that the thermal decomposition of the plutonium salts takes place by raising the temperature of the molten sulfate bath to 750° C.-800° C., said plutonium sulfate being decomposed to crystalline $PuO_2$, whereas the uranyl sulfate $UO_2SO_4$ remains unaffected.

4. A pyroelectrochemical process for reprocessing irradiated nuclear fuels according to claim 1, characterized in that the deposition of the uranium oxide ($UO_2$)

takes place at the cathode of an electrolytic cell at the temperature of 550° C.–600° C., whereas sulfur trioxide and oxygen are evolved at the anode.

5. A pyroelectrochemical process for reprocessing irradiated nuclear fuels according to claim 1, characterized in that the melted sulfates, after decontamination, are recycled to the start of the process.

6. A pyroelectrochemical process for reprocessing irradiated nuclear fuels according to claim 1, characterized in that the melted sulfates which contain the fission products are conditioned by encasing them in a metallic matrix according to a procedure comprising the steps of:

(a) reducing the melted sulfates into a solid granulated form by dropping them onto a cold surface, and (b) dispersing the particulates thus obtained in a metallic matrix by casting a liquid alloy onto the granulated material placed in a cylindrical container.

7. A pyroelectrochemical process for reprocessing irradiated nuclear fuels according to claim 1, characterized in that it comprises the step of electrolytically co-depositing mixed oxides $UO_2$-$PuO_2$ by electrically depositing on the cathode of an electrolytic cell a solid solution of said oxides.

* * * * *